United States Patent
Goh et al.

(10) Patent No.: US 11,507,189 B1
(45) Date of Patent: Nov. 22, 2022

(54) SYSTEM AND METHOD FOR A HAPTIC THIN-FILM ACTUATOR ON ACTIVE PEN TO PROVIDE VARIABLE WRITING PRESSURE FEEDBACK

(71) Applicant: Dell Products, LP, Round Rock, TX (US)

(72) Inventors: Peng Lip Goh, Singapore (SG); Deeder M. Aurongzeb, Austin, TX (US); Weijong Sheu, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/581,253

(22) Filed: Jan. 21, 2022

(51) Int. Cl.
*G06F 3/01* (2006.01)
*G06F 3/044* (2006.01)
*G06F 3/0354* (2013.01)

(52) U.S. Cl.
CPC .......... *G06F 3/016* (2013.01); *G06F 3/03545* (2013.01); *G06F 3/044* (2013.01)

(58) Field of Classification Search
CPC ....... G06F 3/016; G06F 3/03545; G06F 3/044
See application file for complete search history.

(56) References Cited

U.S. PATENT DOCUMENTS

| | | | |
|---|---|---|---|
| 8,416,066 B2 * | 4/2013 | Westerinen | G06F 3/03545 340/407.1 |
| 8,803,671 B2 * | 8/2014 | Westerinen | G06F 3/0416 340/407.1 |
| 9,430,106 B1 | 8/2016 | Olsen | |
| 9,639,181 B2 | 5/2017 | Song | |
| 9,946,345 B2 * | 4/2018 | Park | G06F 3/03545 |
| 10,671,186 B2 * | 6/2020 | Ribeiro | G06F 3/016 |
| 10,691,209 B2 * | 6/2020 | Huizar | G06F 3/03545 |
| 2005/0116940 A1 | 6/2005 | Dawson | |

(Continued)

FOREIGN PATENT DOCUMENTS

EP    3365752 B1    6/2020

OTHER PUBLICATIONS

Y. Cho, et al., "RealPen: Providing Realism in Handwriting Tasks on Touch Surfaces using Auditory-Tactile Feedback," 11 pages, Oct. 4, 2016.

(Continued)

*Primary Examiner* — Michael Pervan
(74) *Attorney, Agent, or Firm* — Prol Intellectual Property Law, PLLC; H. Kenneth Prol

(57) ABSTRACT

An information handling system with a haptic stylus may include a processor; a display device includes a digitizer sensor; the haptic stylus, including: a stylus housing; a microcontroller housed within the housing; a stylus writing tip operatively coupled to a pressure sensor and to detect a pressure on the display device of the information handling system; a spacer mounted around and operatively coupled to a circumferential surface of the stylus housing; a haptic film assembly operatively coupled to the spacer at the circumferential surface of the stylus housing and operable to provide haptic output via an EAP section to a user; and the microcontroller to: receive, as input, a detected pressure applied at the stylus tip from the pressure sensor; and provide the haptic output, via the haptic film assembly and EAP section, at an amplitude and a frequency mimicking an inking sensation.

20 Claims, 7 Drawing Sheets

(56) References Cited

U.S. PATENT DOCUMENTS

| | | | |
|---|---|---|---|
| 2011/0267182 A1* | 11/2011 | Westerinen | G06F 3/03545 340/407.2 |
| 2013/0147748 A1* | 6/2013 | Westerinen | G06F 3/016 345/173 |
| 2013/0307829 A1* | 11/2013 | Libin | G06F 3/016 345/179 |
| 2014/0028592 A1 | 1/2014 | Wang | |
| 2014/0176472 A1 | 6/2014 | Lin | |
| 2014/0198069 A1* | 7/2014 | Park | G06F 3/03545 345/173 |
| 2014/0320462 A1 | 10/2014 | Tseng | |
| 2014/0354553 A1 | 12/2014 | Dai | |
| 2015/0177838 A1 | 6/2015 | Bae | |
| 2015/0212578 A1* | 7/2015 | Lor | G06F 3/03545 345/173 |
| 2015/0261296 A1 | 9/2015 | Koshikawa | |
| 2017/0017310 A1 | 1/2017 | Weddle | |
| 2017/0285774 A1 | 10/2017 | Parikh | |
| 2017/0364167 A1* | 12/2017 | Ribeiro | G06F 3/0442 |
| 2019/0384402 A1* | 12/2019 | Huizar | G06F 3/03545 |
| 2021/0216144 A1 | 7/2021 | Hopfer | |
| 2021/0247845 A1* | 8/2021 | Kugerl | H01L 41/08 |
| 2021/0325980 A1 | 10/2021 | Lin | |

OTHER PUBLICATIONS

J. Lee, et al., "Haptic Pen: A Tactile Feedback Stylus for Touch Screens," 6 pages, Oct. 2004.

* cited by examiner

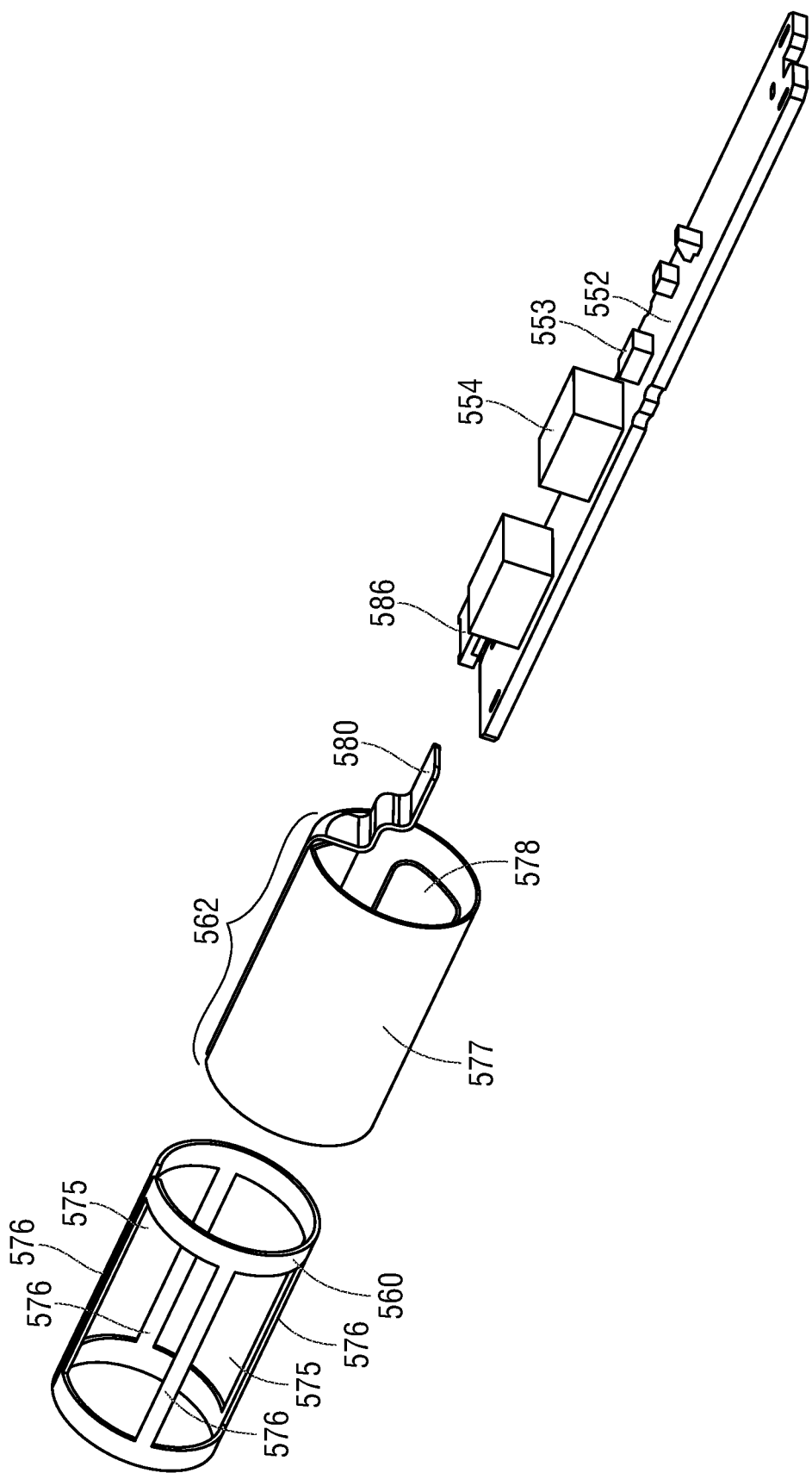

SYSTEM AND METHOD FOR A HAPTIC THIN-FILM ACTUATOR ON ACTIVE PEN TO PROVIDE VARIABLE WRITING PRESSURE FEEDBACK

FIELD OF THE DISCLOSURE

The present disclosure generally relates to haptic feedback devices. The present disclosure more specifically relates to haptic feedback to a user during operation of an input device associated with an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include a stylus or other pen-type pointing device used by the user to provide input to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a perspective view of an arrangement of a spacer and a haptic film assembly for a haptic stylus relative to a printed circuit board (PCB) according to an embodiment of the present disclosure;

The use of the same reference symbols in different drawings may indicate similar or identical items.

DETAILED DESCRIPTION OF THE DRAWINGS

Figure 1:
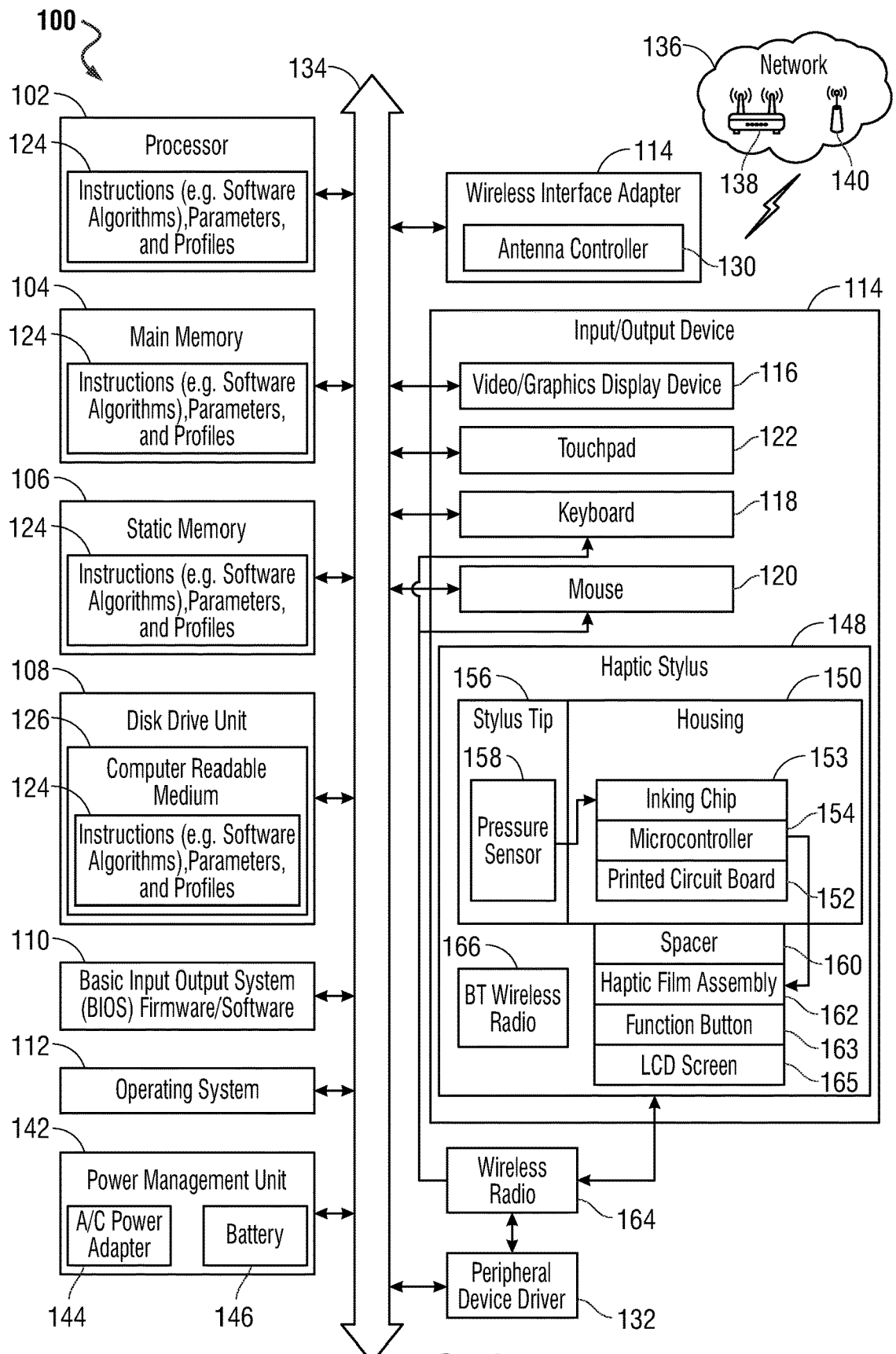
FIG. 1 is a block diagram illustrating an information handling system with a haptic stylus according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Input devices such as a mouse, a keyboard, or a stylus, allows a user to interface with an information handling system and provide input. When using an active stylus to virtually write, for example, on a display panel, the writing experience is very different from that of pen on a paper. This is a result of the texture feedback that usually is present in writing on paper that is not present when writing on a screen or other similar surface using a stylus. On a surface such as glass, a user implementing a stylus would not feel the friction created as the stylus tip is drawn across the glass surface. This has been alleviated to a degree by providing texture on the surface of the glass and/or altering the type of material or texture of the stylus tip is made of.

A stylus also doesn't provide feedback to a user indicating the pressure used against the surface of the display device. Without this tactile feedback, the initiation of "inking" onto the surface of the display device for virtual writing and the termination of that inking cannot be determined adequately or similarly as that with an ink pen or other writing implement on the surface of a piece of paper. Still further, when using a stylus, a user may not feel a differentiation in pressure in order to make fine lines (little pressure) or thick lines (heavy pressure) on the display device.

Embodiments of the present disclosure provide for an information handling system, that includes a processor, a data storage device, and a power management unit. The information handling system may interface wirelessly or by wire with a haptic stylus. The haptic stylus may include a pressure sensor, inking chip and microcontroller unit used to control the actuation of a haptic film portion of the haptic film assembly in the haptic stylus so that a user may receive haptic feedback that mimics the use of a pen or other writing implement on the surface of a piece of paper, for example. In an embodiment, the haptic stylus may include a haptic film assembly with one or more electro-active polymer (EAP) sections and a flexible circuit board coupled to a housing of the stylus. This haptic film assembly with EAP sections provides a vibrating haptic sensation at an amplitude or a frequency via the haptic film assembly to mimic an inking sensation over a surface at the detected pressure to a user. In an embodiment, the pressure sensor at a stylus tip may be used to provide an inking chip and a microcontroller with pressure data in order to determine the pressure against a surface such as a video/graphics display device, a pad, or other surface. The detected pressure may be used via the microcontroller unit to vary the amplitude and frequency of the vibrations created by the haptic film assembly with the EAP in order to provide a different haptic sensation to the user.

In an embodiment the haptic stylus includes a function button or a liquid crystal display (LCD) screen that allows the user to provide further input with the haptic stylus and monitor the status of the functions of the haptic stylus. In these examples, the function button may be actuatable by a user in order to make mode changes and/or perform a selection process on a video/graphics display device. In the embodiment where the function button is used to change a mode of the haptic stylus, these modes may include, among other options, changes to the color of "ink" applied to a virtual surface, type of inking such as pen, pencil, calligraphy, highlighting, or similar writing modes, changes in audio feedback or lack thereof from writing, line thicknesses or the like. An actuated change in mode may be indicated via the haptic film assembly in some embodiments with a different haptic feedback frequency or amplitude created by the operation of the haptic film assembly with the EAP section or sections than used to provide inking haptic feedback to a user. The function button may change, or the function screen may also provide for haptic feedback modes currently selected by the user on the haptic stylus when writing in some embodiments.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory 104, 106, 108 (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices. The information handling system 100 may include or interface with one or more communications ports for communicating with external devices, as well as various input and output (I/O) devices 114, such as a keyboard 118, a touchpad 122, a mouse 120, a headset, a stylus 148, a video/graphics display device 116, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 124 that may operate on servers or systems, remote data centers, or on-box in individual client information handling systems according to various embodiments herein. In some embodiments, it is understood any or all portions of instructions (e.g., software algorithms), parameters, and profiles 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, or other memory of computer readable medium 126 storing instructions (e.g., software algorithms), parameters, and profiles 124 executable by the antenna controller 130, embedded controller, or any other processing device (e.g., processor 102), and disk drive unit 108 (volatile (e.g., random-access memory, etc.), nonvolatile memory (read-only memory, flash memory etc.) or any combination thereof. The information handling system 100 may also include one or more buses 134 operable to transmit communications between the various hardware components such as any combination of various I/O devices 114 as well as between processors 102, an embedded controller, the operating system (OS) 112, the basic input/output system (BIOS) 110, the wireless interface adapter 128, a radio module, a peripheral device driver 132, or a wireless radio 164 among other components described herein. The information handling system 100 may be in wireless communication with the haptic stylus 148 and/or other input/output devices 114 such as a mouse 120 or keyboard 118.

The information handling system 100 may further include a video/graphics display device 116. The video/graphics display device 116 in an embodiment may function as a liquid crystal display (LCD), an organic light emitting diode (OLED), a flat panel display, or a solid-state display. Additionally, the information handling system 100 may include one or more I/O devices 114 that allow the user to interface with the information handling system 100 via the video/graphics display device 116, such as a cursor control device (e.g., the mouse 120, touchpad 122, or gesture or touch screen input), and the keyboard 118 or stylus 148, among others. Various drivers and control electronics may be operatively coupled to operate the I/O device 114 according to the embodiments described herein.

The network interface device in FIG. 1 is shown as wireless interface adapter 128 but may also be a wired network interface device as is understood in the art and may provide connectivity to a network 136, e.g., a wide area network (WAN), a local area network (LAN), wireless local area network (WLAN), a wireless personal area network (WPAN), a wireless wide area network (WWAN), or other network. The network interface device shown as wireless interface adapter 128 may provide connectivity to a network 136 via operation of a radio module (not shown) being controlled by an antenna controller 130. In an embodiment, the radio module may be operatively coupled to the antenna controller 130 but may form a different physical device in some embodiments. In an embodiment, the bus 134 may be implemented to communicate with the wireless radio 164. It is appreciated that any number of radios 164 and RF front ends (not shown) may be associated with the radio module and may also be associated with a plurality of antennas within the information handling system and may operate under any wireless protocol described herein. In an example embodiment, the radio module may be a 5G mmWave radio module and may be referred to as a 5G module or 5G radio module herein. Connectivity to a network 136 may be via wired or wireless connection. The wireless interface adapter 128 may operate in accordance with any wireless data communication standards in various embodiments. To communicate with a wireless local area network, standards including IEEE 802.11 a/h/j/n/ac/ax WLAN standards, IEEE 802.15 WPAN standards, WWAN such as 3GPP or 3GPP2, or similar wireless standards may be used. In some aspects of the present disclosure, one wireless interface adapter 128 may operate two or more wireless links. Information handling systems 100 including those that are mobile in embodiments of the present disclosure may employ a plurality of antenna systems for communication via wireless links operating on a variety of radio access technologies (RAT). For example, a mobile information handling system in an embodiment of the present disclosure may employ separate antenna systems for Wi-Fi signals, wireless wide area network (WWAN) signals, Bluetooth signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, 5G standards, small cell WWAN, and the like. Wi-Fi and WLAN signals in embodiments of the present disclosure may include wireless links adhering to standards such as, for example, IEEE 802.11 WiFi, IEEE 802.11ad WiGig, IEEE 802.15 WPAN, and IEEE 802.11ax-2021 (e.g., WiFi 6 and 6E, 6 GHz technologies). In other aspects, several antenna systems may be available for each RAT to enable aggregated data communications such as via plural multiple in, multiple out (MIMO) streams (e.g., Wi-Fi MIMO or cellular MIMO) to enhance data bandwidth or reliability. In some examples, an information handling system 100 may support multi-RAT radios (4G, 5G, WLAN) that require simultaneous transmission using multiple antennas to support various modes of transmission (e.g., uplink (UL) MIMO and 5G E-UTRAN new radio (EN-DC)). With 5G technology, these information handling systems may use, in an example embodiment, sub-6 GHz antennas and mmWave antennas, resulting in several antennas operating in the information handling system.

Wireless interface adapter 120 may connect to any combination of macro-cellular wireless connections including 2G, 2.5G, 3G, 4G, 5G, emerging 6G or the like from one or more service providers or privately administered network providers. The wireless interface adapter 128 may also connect to any WLAN networks such as Wi-Fi networks. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 136 may communicate voice, video or data over the network 136. Further, the instructions 124 may be transmitted or received over the network 136 via the network interface device or wireless interface adapter 128.

The information handling system 100 may include a set of instructions 124 that may be executed to cause the computer system to perform any one or more of the methods or computer-based functions disclosed herein. For example, instructions 124 may be executed by an antenna controller 130 and radio module, a processor 102, inking chip 153, and/or microcontroller 154 and may include software agents, or other aspects or components used to execute the methods and systems described herein. Various software modules comprising application instructions 124 may be coordinated by an operating system (OS) 112, and/or via an application programming interface (API). An example OS 112 may include Windows®, Android®, and other OS types. Example APIs may include Win 32, Core Java API, or Android APIs.

Additionally, execution of the instructions described herein may be via execution of firmware by the inking chip 153 or microcontroller unit 154 of the haptic stylus 148 in an embodiment. It is contemplated that in some embodiments the inking chip 153 and microcontroller unit 154 may be combined in a single chip executing code instructions for the inking function and the haptic feedback control in some embodiments such as all such functions executed by a single microcontroller unit 154. In other embodiments, separate inking chip 153 and microcontroller unit 154 may be used or portions of the functions including detection of pressure levels from a pressure sensor may be accomplished by either chip, both chips or a combined controller in various embodiments. For embodiments herein, the system is generally described with both an inking chip 153 and a microcontroller unit 154 however for purposes of embodiments herein those elements may be combination inking chip and microcontroller unit utilized for any of the embodiments of the present disclosure.

The disk drive unit 108 may include a computer-readable medium 126 in which one or more sets of instructions 124 such as software may be embedded and executed by the antenna controller 130, processor 102, inking chip 153, or microcontroller unit 154, and/or embedded controller, in other embodiments. Similarly, main memory 104 and static memory 106 may also contain a computer-readable medium for storage of one or more sets of instructions, parameters, or profiles 124. The disk drive unit 108 and static memory 106 may also contain space for data storage. Further, the instructions 124 may embody one or more of the methods or logic as described herein. For example, instructions relating to and executed by the inking chip 153 or microcontroller unit 154 processor 102, software algorithms, processes, and/or methods may be stored here. In a particular embodiment, the instructions, parameters, and profiles 124 may reside completely, or at least partially, within the main memory 104, the static memory 106, and/or within the disk drive 108 during execution by the processor 102 of information handling system 100. As explained, some or all of the instructions 124 to be executed by a processor 102 for software applications may be executed locally, remotely or a combination thereof. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The computer executable instructions 124 to be executed by the processor 102, embedded controller, inking chip 153, or microcontroller unit 154 may be stored in static memory such as 106 or separate static memory on the haptic stylus 148 on a computer-readable medium 126 such as a flash memory or magnetic disk in an example embodiment. In some embodiments, an information handling system's computer executable instructions may also be stored in a memory medium of a disk drive unit 108 or static memory 106 such as for application software, operating systems, or the like. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. The haptic stylus 148, according to embodiments herein, may include one or more ASICs or controllers such as an inking chip 153 or microcontroller unit 154 or an ASIC or controller that performs the combined operations of the inking chip 153 and microcontroller 154 and may include memory such as static memory. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

As described herein, the information handling system 100 may further include a power management unit (PMU) 142 (a.k.a. a power supply unit (PSU)). The PMU 142 may manage the power provided to the components of the information handling system 100 such as the processor 102, one or more disk drive units 108, a graphical processing unit (GPU), a video/graphic display device 116 or other I/O device 114 such as the stylus (e.g., via a wired or wireless charging system), and other components that may require power when a power button has been actuated by a user. In an embodiment, the PMU 142 may monitor power levels and be electrically coupled to the information handling system 100 to provide this power and coupled to bus 134 to provide or receive data or instructions. The PMU 142 may regulate power from a power source such as a battery 146 or A/C power adapter 144. In an embodiment, the battery 146 may be charged via the A/C power adapter 144 and provide power to the components of the information handling system 100 via wired connections as applicable, or when A/C power from the A/C power adapter 144 is removed.

As described herein, the input/output devices 114 associated with the information handling system 100 includes a haptic stylus 148 according to embodiments of the present description. This haptic stylus 148 may provide to a user a sensation during use for virtual writing by inking over a surface for marking a displayed sheet or user interface when the haptic stylus 148 is used on, for example, a glass surface on a video/graphic display device 116 or other surface that does not provide a sensation similar to pen or pencil on paper as the haptic stylus 148 is passed across its surface. In an embodiment, the haptic stylus 148 may be operatively coupled to the information handling system 100 via, for example, a Bluetooth (BT) wireless radio 164 placed within the haptic stylus 148. In this example embodiment, the BT wireless radio 164 of the haptic stylus 148 may communicate with the information handling system 100 via a wireless radio 164 operatively coupled to a peripheral device driver 132 executed to allow for communication between the information handling system 100 and the haptic stylus 148. Wireless radio 164 may operate according to other protocols as well such as in some embodiments, near field communication (NFC) protocols or 5G protocols. Wireless radio 164 may also be part of wireless interface adapter 128 in some embodiments. Because the haptic stylus 148 may be an active haptic stylus 148, such wireless communication via the wireless radio 164 may be in addition to the direct communication from the active haptic stylus 148 via the inductive interactions between the haptic stylus 148 and, for example, a digitizer formed within the video/graphic display device 116. In an embodiment, an inductive sensor may be placed within the stylus tip 156 for the digitizer to detect the inductive interactions. This interaction allows the active haptic stylus 148 to provide input to the information handling system 100 via this digitizer in the video/graphic display device 116. This input includes providing virtual writing input directly on a graphic display on the video/graphic display device 116, input object selection via a dedicated function button 163 on the active haptic stylus 148, as well as other inputs that are based on the selectable icons and programs executed on the information handling system 100 and presented to the user via the video/graphic display device 116. The digitizer within the video/graphic display device 116, where available, may transmit this input to a dedicated controller or the processor 102 to provide data on pen location, pressure, and other functionalities of the haptic stylus 148.

The haptic stylus 148, along with the function button 163 may also include a liquid crystal display (LCD) screen 165. The LCD screen 165 and function button 163 may both be used to add functionality to the haptic stylus 148 as well as provide or change the type of input at the video-graphics display device. In an embodiment, the function button 163 may also allow a user, through a series of actuations for example, to change the haptic feedback experienced during use of the haptic stylus 148. In this example embodiment, the LCD screen 165 may display a current writing mode or haptic feedback characteristics produced by the haptic film assembly 162 with the EAP (e.g., frequency or amplitude expressed via indicators such as heavy, light, medium, etc.) that can be toggled between using the function button 163 or the LCD screen 165. The haptic film assembly 162 may provide haptic feedback of a mode change with a different, typically higher frequency, of haptic feedback to the user indicating a mode change or selection of writing mode or change of type of haptic feedback to be experienced during virtual writing with the haptic stylus 148. The menu presented on the LCD screen 165 may include any number of sub-menus that allows the user to, for example, change the time and date, change writing mode such as color, type of writing or highlighting, change the haptic feedback, access charging data, pairing data between the haptic stylus 148 and the information handling system 100, and the like. Toggling may also provide a different haptic feedback frequency via the haptic film assembly 162 to let the user know that mode or menu navigation is occurring successfully. In an embodiment, the LCD screen 165 may continuously display a date and time and current haptic feedback settings as described herein.

As the stylus tip 156 is pressed against a surface such as the video-graphics display device 116, this pressure data may be sent to an inking chip 153 operatively coupled to the printed circuit board 152 formed within the housing 150 of the active haptic stylus 148. In an embodiment, an increase in the pressure of the stylus tip 156 against the video-graphics display device 116 may be detected by the inking chip 153 as communicating inking and is used to detect pressure levels (e.g., 4096 levels of the pressure levels detected) and this may be reflected as a thicker line being displayed on the video-graphics display device 116 due to the operation of the digitizer in the video-graphics display device 116 and wireless feedback, e.g. via BT, from the inking chip to the application program. In order to reflect these changing pressures on the writing tip of the active haptic stylus 148 during writing haptically to the user, the microcontroller 154 is operatively coupled to the inking chip 153 and may generate haptic signals via the haptic film or EAP section or sections of the haptic film assembly 162 as output representative of the stylus tip 156 being drawn across a display 116 surface at a particular pressure level to mimic an inking sensation on paper over that surface at the detected pressure. In an embodiment, the mimicked surface the haptic output signals generated by the microcontroller 154 may include paper or other types of writing surfaces as well as other types of writing instruments such as a pencil, highlighter, calligraphy pen, chalk, or various types of pens used with paper, parchment, slate, glass, or other surfaces.

These haptic output signals may be relayed from the microcontroller 154 to a haptic film assembly 162 operatively coupled around an outside surface of the haptic stylus 148. It is this haptic film assembly 162 the provides haptic feedback or output to the user at an amplitude and a frequency to mimic an inking sensation over a surface at the detected pressure. In an embodiment, this frequency may be between 10 and 500 Hz. In an embodiment, the haptic film assembly 162 is operatively coupled to the outside surface of the housing 150 where the user would grip the active haptic stylus 148. In an embodiment, the surface area of the haptic film assembly 162 may vary depending on an anticipated location where the users may vary the users' grip on the active haptic stylus 148.

The haptic film assembly 162 may, in an embodiment, be an EAP such as a piezoelectric polymer film haptic actuator that is operatively coupled to a circumferential outer surface of the housing 150 of the active haptic stylus 148. The haptic film assembly 162 may include one or more portions of a thin (e.g., 150 μm thick), flexible, electro-active polymer (EAP) film on a flexible circuit layer, where the EAP film portions or sections may be actuated at an amplitude and frequency according to the pressure detected by the pressure sensor 158 at the stylus tip 156. In an embodiment, this frequency may be between 10 and 500 Hz for mimicking inking or writing/drawing on paper or another surface. In an embodiment, this frequency can be increased or decreased via the LED screen 163 and actuation of the function button 163. In another embodiment, a different frequency from the EAP sections may be used to indicate actuation of modes or navigation of menus via the function button 163 or LCD screen 165. The number and location of the sections of the EAPs on the haptic film assembly 162 may range from a one or two to more than two and may vary depending on the level of haptic feedback to be felt by the user. In an example embodiment, the number of the EAP sections on the thin film flexible circuit layer of the haptic film assembly 162 devices is four with the EAP sections arranged equal distances from each other around the circumference of the housing 150. In an embodiment described herein, the haptic film assembly 162 may further include a thin film flexible circuit lead line that operatively couples the haptic film assembly 162 and its thin film flexible circuit layer and EAP sections to the microcontroller 154 in order to transmit the haptic feedback signals from the microcontroller 154 to the individual EAP sections on the haptic film assembly 162 of the haptic film assembly 162. In an embodiment, a slit or hole may be formed through the housing 150 of the active haptic stylus 148 for the thin film flexible circuit lead line to be passed through to a port associated with the microcontroller 154. In an embodiment, the EAP sections on the haptic film assembly 162 may be oriented inward on the thin film flexible circuit layer wrapped circumferentially around the housing of the haptic stylus 148 towards the core of the haptic stylus 148 to protect the EAP sections on the haptic film assembly 162 with the outside of the thin film flexible circuit layer.

The haptic film assembly 162 may, in an embodiment, be operatively coupled to a spacer 160 that has been operatively coupled to an outer, circumferential surface of the housing 150 of the active haptic stylus 148. In this embodiment, the spacer may be used to allow space for the EAP sections on the haptic film assembly 162 to vibrate at the amplitude and frequency used to mimic the inking sensation over the surface of the active haptic stylus 148. In some example embodiments, the spacer 160 may have a series of voids in a shape that matches the holes of the spacer with the placement of the EAP sections on the thin film circuit layer of the haptic film assembly 162. In this embodiment, the spacer 160 includes a hole for each of the EAP sections on the haptic film assembly 162 thin film circuit layer when the EAP sections are oriented inward and to be placed within the voids of the spacer 160 such that both are operatively coupled to the outer circumferential surface of the housing 150. This orientation of the EAP sections on the thin film circuit layer aligned with voids in the spacer permit movement for the haptic feedback to occur via the EAP sections without contacting the circumferential surface of the haptic stylus housing during operation when the EAP sections are oriented inward from the thin film circuit layer of the haptic film assembly 162 wrapped around the stylus housing. In an embodiment, the stylus housing 150 may have a recess, such as circumferential notch in a cylindrical housing of the haptic stylus 148, into which the spacer 160 is operatively coupled to the surface of the stylus housing 150 and then the haptic film assembly 162 is operatively coupled to the spacer 160 at the recess. This recess is deep enough to accommodate for the thicknesses of the spacer 160 and haptic film assembly 162 and in some embodiments an outer layer and cause the height of the haptic film assembly 162/spacer 160 to be flush with the remaining portions of the housing 150 along length of the haptic stylus 148. Typically the haptic stylus housing may be cylindrical however other shapes including elongated polygons such as triangular, squared, hexagonal, or other shapes of the stylus housing are also contemplated in embodiments herein.

As described herein, the haptic stylus 148 may include a housing 150 used to house the components of the haptic stylus 148 as well as serve as a rigid structure the user may grip when using the haptic stylus 148. In an embodiment, this housing 150 may be made of metal, plastic, or a combination thereof. In an embodiment, the housing 150 houses a printed circuit board (PCB) 152 used to provide the surface onto which the various components and circuitry within the housing 150 may be affixed. In this embodiment, the PCB 152 may include the circuitry of the inking chip 153 and a microcontroller 154 to process signals received from a pressure sensor 158 housed at or within a stylus tip 156 operatively coupled to the housing 150. In an embodiment, the PCB 152 may further include other components such as a Bluetooth wireless radio 166 used to communicate with the information handling system 100, and access to a power source or a local power management unit (PMU) to operatively couple a power source such as a rechargeable battery to the inking chip 153, the microcontroller 154, and haptic film assembly 162 as well as other devices, such as a motion sensor, among other devices.

In an embodiment, the housing 150 and/or haptic film assembly 162 and spacer 160 may be protected from being physically touched by the user during use. In an embodiment, the space around the haptic film assembly 162 and spacer 160 may be covered with an outer trim layer such as a silicone layer that prevents the user from touching the haptic film assembly 162 as well as provide additional grip friction for the user to grip the active haptic stylus 148. In another embodiment, a layer of fabric may be placed over the housing 150 of the active haptic stylus 148 including the haptic film assembly 162 and spacer 160 so that, again, the user does not physically touch the haptic film assembly 162 and so that the active haptic stylus 148 may have an aesthetic appeal. In either of these embodiments, a glue or other adhesive may be used to secure the silicone or fabric to the housing 150 of the active haptic stylus 148 as well as the haptic film assembly 162 and spacer 160 so that the haptic film assembly 162 and spacer 160 do not move along the surface of the housing 150 during operation of the active haptic stylus 148. Still further, a glue or other adhesive may be used to secure the spacer 160 to the housing 150 and the haptic film assembly 162 to the spacer 160. This allows the haptic film assembly 162 to provide haptic output to a user while the haptic film assembly 162 and spacer 160 are maintained in one location.

As described herein, the haptic film assembly 162 includes a thin film flexible printed circuit layer or thin film printed circuit board (PCB) with one or more electro-active polymer (EAP) haptic film portions or sections. The EAP may be any polymer that exhibits a change in size or shape when stimulated by an electric field provided by via electrical leads formed in the thin film circuit layer or PCB. The thin film flexible PCB may be arranged so that the haptic film portions of the haptic film assembly 162 are oriented inward to fit in the spacer gaps for room to allow movement of the EAP haptic film portions for haptic response and to further protect the haptic film EAP sections from damage exposure to external forces on the haptic stylus housing body.

During use, the user may grip the haptic stylus 148 using, for example a three-finger grip near the stylus tip 156. At this location, the haptic film assembly 162 and spacer 160 have been operatively coupled to the housing 150 of the active haptic stylus 148. With the user gripping the active haptic stylus 148 at the location of the haptic film assembly 162, the user may provide input to the information handling system 100 by causing the stylus tip 156 to come into contact with the video-graphics display device 116. Depending on the application being executed by the processor 102 of the information handling system 100, the video-graphics display device 116 may detect input via, for example, a digitizer that interprets the input and provides this input data to the processor 102. In an example embodiment, the processor 102 may be executing a word processing application or a vector graphics editor that receives the user's strokes on the video-graphics display device 116 and interprets them as text or creates images based on the strokes from the active haptic stylus 148. In these example embodiments, the pressure of the stylus tip 156 against the surface of the video-graphics display device 116 may cause the thickness of the lines created to be rendered thicker when the pressure is higher or thinner when the pressure is lower via the inking chip 153. This differing amount of pressure may be detected by the pressure sensor 158 at or within the stylus tip 156. The sensed pressure may be sent to the inking chip 153 to determine inking has occurred and what level of pressure (e.g., 4052 levels) is applied. The sensed pressure data may be sent to and used by the microcontroller 154 to create haptic feedback that mimics an inking sensation over a surface at the detected pressure such as a pen on paper or other typical writing surface. Because the physical surface of the video-graphics display device 116 and the stylus tip 156 does not create the same texture feel as writing on paper with an ink pen, this haptic feedback may give the feel to a user that the user is writing on paper or some other writing surface.

In an example embodiment, the peripheral device driver 132 associated with the operations of the active haptic stylus 148 may provide a user with an interface to change the type of drawing implemented and type of paper to which the haptic feedback generated by the active haptic stylus 148 is to mimic. For example, the user interface presented may provide the user with the option to select between different types of surfaces such as computer paper, cardboard, chalkboard, whiteboard, or other writing surfaces that that haptic feedback is to mimic. Additionally, in an embodiment, the user interface may present to the user options of which type of writing implement the haptic feedback is to mimic such as a ballpoint pen, a fountain pen, a pencil, a paint brush (e.g., very course hair, very fine course hair, etc.), a marker, and chalk, among other mediums. In an embodiment, a function button 163 and LCD screen 165 may be formed in the haptic stylus 148 may also provide a graphical user interface (GUI) for allowing one or more mode changes which may be coordinated, such as via wireless radio as a BT radio, with a peripheral device driver 132 on the information handling system 100.

In these embodiments, these selected drawing implements, and media to be mimicked by the haptic feedback may be transmitted to the active haptic stylus 148 via, for example, the wireless radio 164 of the information handling system 100 and BT wireless radio 166 of the active haptic stylus 148. After receiving this data, the microcontroller 154 may, along with the pressure data detected by the pressure sensor 158 and inking chip 153 in some embodiments, create appropriate signals defining haptic feedback to be produced at the haptic film assembly 162. These signals from the microcontroller 154 are received at the haptic film assembly 162 causing the EAPs on the haptic film assembly 162, for example, to vibrate at an amplitude and frequency that mimics an "inking" sensation (e.g., a haptic feeling that mimics the passing of a writing instrument over a surface such as paper) to the user. In an embodiment, this frequency may be between 10 and 500 Hz.

In the embodiments herein, as the pressure increases, the amplitude and/or frequency of the vibrations created via actuation of the haptic film assembly 162 may increase. Additionally, as the pressure decreases, the amplitude and/or frequency of the vibrations created via actuation of the haptic film assembly 162 may decrease. By providing this haptic feedback via the active haptic stylus 148, the user may determine when an inking is occurring on the video-graphics display device 116 as well as to what degree the pressure exerted onto the surface of the video-graphics display device 116 with the active haptic stylus 148 increase the thickness of an inking mark on the screen.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
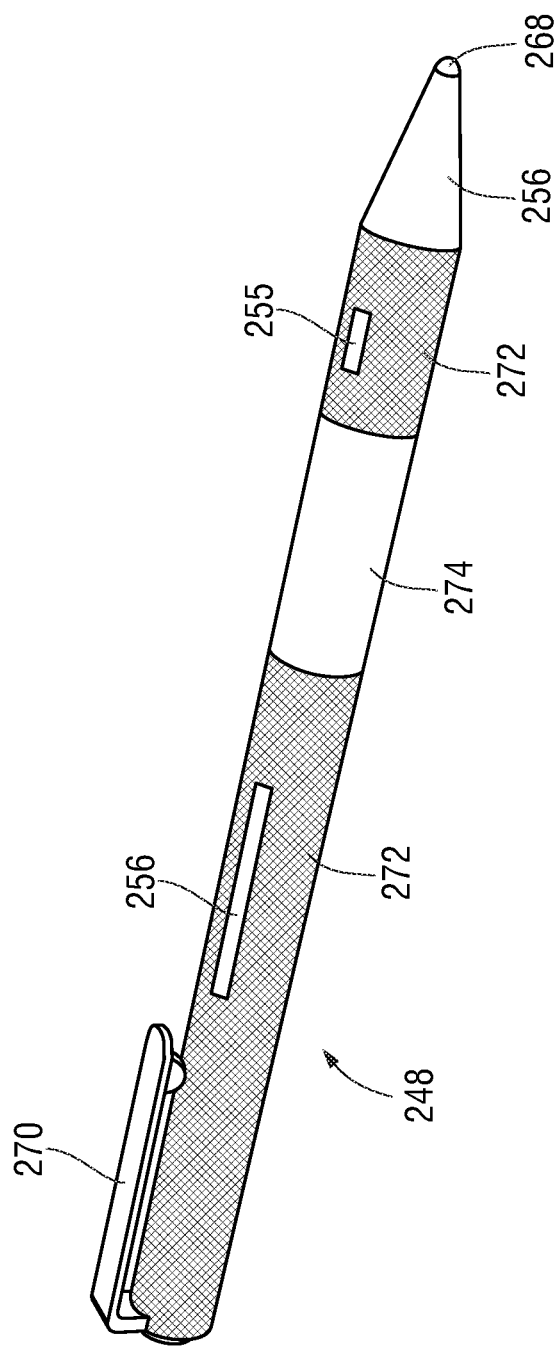
FIG. 2 is a side view of a haptic stylus according to an embodiment of the present disclosure.

FIG. 2 is a side view of a haptic stylus 248 according to an embodiment of the present disclosure. FIG. 2 shows the stylus tip 256 at a distal end of the stylus tip 256. At a distal end of the haptic stylus 248, a pen clip 270 or other clipping device used by a user to secure the haptic stylus 248 to a shirt pocket or other similar storage option. In an embodiment, the pen clip 270 may not be present and the haptic stylus 248 may instead be allowed to be stored at or in the information handling system (e.g., information handling system 100, FIG. 1) at, for example, a storage location formed into a chassis of the information handling system.

In an embodiment, the housing of the haptic stylus 248 may generally be covered in an outer trim layer 272 such as with fabric, silicon, or another material. This outer trim layer 272 may provide an aesthetic appeal to the user in an embodiment. Additionally, in an example embodiment, the outer trim layer 272 may be used to help secure the haptic film assembly (e.g., haptic film assembly 162, FIG. 1) and spacer (e.g., spacer 160, FIG. 1) to the housing of the haptic stylus 248 and prevent movement of the haptic film assembly and spacer during use of the thin film flexible circuit board. In the embodiment shown in FIG. 2, the haptic stylus 248 may include an outer trim layer 272 bifurcated by a silicon portion 274 covering the haptic film assembly and spacer. It is appreciated, however, that the outer trim layer 272 may be made of fabric (entirely or partially), made of silicone, or made of another type of material, or combinations thereof, used to cover the haptic film assembly and spacer as well as the remainder of the stylus housing.

In the embodiment shown in FIG. 2, the haptic stylus 248 may include a silicone portion 274 of an outer trim layer that is placed over the haptic film assembly and spacer as described herein. This silicone portion 274 may be operatively coupled to the haptic film assembly thin film flexible PCB and spacer using an adhesive. In an embodiment, the dimensions of the silicone portion 274 may extend past the dimensions of the haptic film assembly and spacer so that the silicone portion 274 is secured to the haptic film assembly and spacer and the housing of the haptic stylus 248. In the embodiment, the silicone portion 274 of the outer trim layer 272 and may be placed between two sections of the outer trim layer 272 wrapped around a remaining portion of the housing of the haptic stylus 248.

In an embodiment, the stylus tip 256 of the haptic stylus 248 may include a moveable writing tip 268. The moveable writing tip 268 of the stylus tip 256 may be internally coupled to a pressure sensor (not shown) such that as pressure is exerted against the moveable writing tip 268, the moveable writing tip 268 may be moved or displaced a certain distance registering a pressure at the moveable writing tip 268 with the pressure sensor. As described herein, the pressure sensor may send this pressure data to the microcontroller so that the microcontroller may generate haptic feedback signals that are sent to the haptic film assembly in order to provide the haptic output at an amplitude and a frequency via the haptic film assembly to mimic an inking sensation during use of the haptic stylus 248 over a surface such as a display screen of an information handling system at the detected pressure.

As described herein, the haptic stylus 248 may include its own LCD screen 256 and a function button 255. The LCD screen 256 and function button 255 may both be used to add functionality to the haptic stylus 248 as well as provide or change the type of input or mode of writing detected by the digitizer at the video-graphics display device of the information handling system. In an embodiment, the function button 255 may also allow a user, through a series of actuations for example, to change a writing mode or change the haptic feedback experienced during use of the haptic stylus 248. In this example embodiment, the LCD screen 256 may display a current writing mode or haptic feedback characteristics. During mode or menu selection via the function button 255 or LCD screen 256, haptic feedback may be produced by the haptic film assembly with the EAP that may be a different frequency, for example higher frequency, than during a writing or drawing function and the frequency used to mimic an inking sensation. Further, the haptic feedback levels may be adjustable via the function button 255 or LCD screen 256 (e.g., frequency or amplitude expressed via indicators such as heavy, light, medium, etc.) that can be toggled between using the function button 255 or toggled and shown via the LCD screen 256. The menu presented on the LCD screen 256 may include any number of sub-menus that allows the user to, for example, change the time and date, change writing modes, change the haptic feedback, access charging data, pairing data between the haptic stylus 248 and the information handling system, and the like. In an embodiment, the LCD screen 256 may continuously display a date and time and current haptic feedback settings as described herein.

Although FIG. 2 shows a specific embodiment of a haptic stylus 248, the present specification contemplates that the haptic stylus 248 may have a different form factor. In an example embodiment, the fabric or other outer trim layer 272 may be operatively coupled to the entire outer surface of the housing of the haptic stylus 248 and does not include the silicone portion 274. In this embodiment, the fabric or other outer trim layer 272 may similarly be operatively coupled to the underlying haptic film assembly and spacer via a glue or other adhesive so that that haptic film assembly and spacer may be maintained at the location on the housing of the stylus tip 256. In an embodiment, the location where the haptic film assembly and spacer are operatively coupled to the housing of the haptic stylus 248 may vary based on an anticipated location of where a user may or will grip the haptic stylus 248 using, for example, a three-finger grip.

Figure 3:
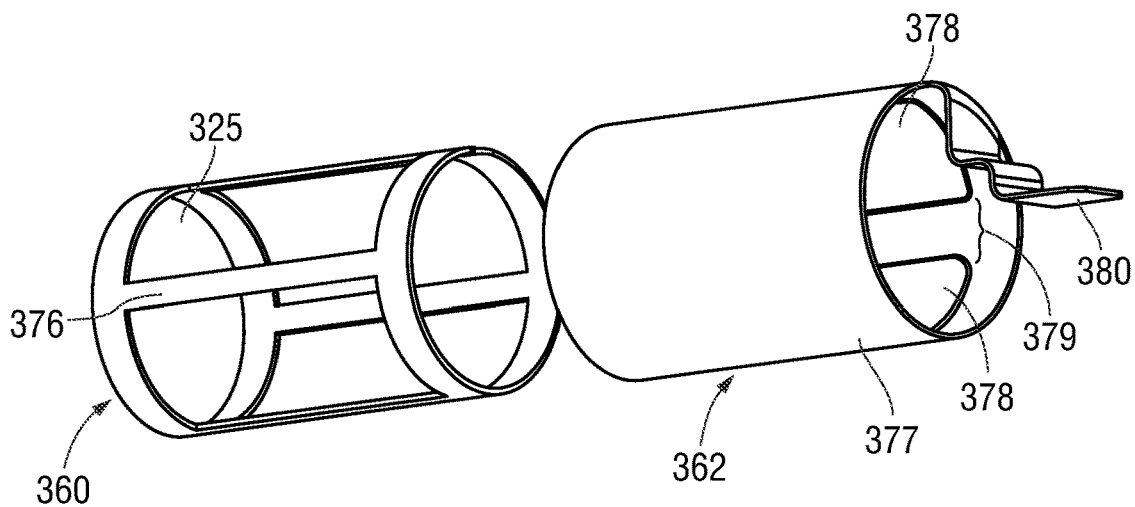
FIG. 3 is a perspective view of a spacer and a haptic film assembly for a haptic stylus according to an embodiment of the present disclosure.

FIG. 3 is a perspective view of a spacer 360 and a haptic film assembly 362 for a haptic stylus according to an embodiment of the present disclosure. As described herein, the haptic film assembly 362 may include at least one section of the EAP 378 operatively coupled to the thin film flexible circuit board 377 or flexible circuit layer of the haptic film assembly 362. The thin film flexible circuit board 377 may include a plurality of electrical traces for power as well as command lines to the section or sections of EAP 378. In the example embodiment shown in FIG. 3, the haptic film assembly 362 includes four EAP sections 378 evenly distributed around the inner surface of the flexible circuit board 377 of the haptic film assembly 362. In an embodiment and for ease of assembly, the haptic film assembly 362 includes a break (not shown) between the piezoelectric devices 378 so that the haptic film assembly 362 can be wrapped around the spacer 360 such that terminal ends of the haptic film assembly 362 abut each other.

As described herein and shown in FIG. 3, the spacer 360 includes a lattice that allows the EAP sections 378, as oriented inwardly, to be placed within the voids 375 formed in the spacer 360 when the haptic film assembly 362 is operative coupled to the spacer 360. The spacer 360 may be made of Mylar® or other suitable material that can act as a rigid or semi-rigid spacer that raises portions of the haptic film assembly 362 away from the housing of the haptic stylus described herein. In the embodiment shown in FIG. 3, the spacer 360 includes ribs 376 running between the voids 375 formed in the spacer 360. These ribs 376 may be located between the EAP sections 378 at breaks 379 when the haptic film assembly 362 is operatively coupled to the spacer 360 so that the EAP sections 378 of the haptic film assembly 362 are maintained at a location away from the housing of the haptic stylus. This spacer 360 and its ribs 376 allows the EAP sections 378, therefore, to vibrate when activated without coming into contact with the housing of the haptic stylus.

As described herein, the haptic film assembly 362 includes a thin film flexible circuit lead line 380. This thin film flexible circuit lead line 380 is used to provide an operative connection between the lead lines from each of the piezoelectric devices 378 and an electrical port operatively coupled with the microcontroller. This electrical port may be a serial port that is operatively coupled to a PCB within the housing of the haptic stylus and, via lead lines from the port, is operatively coupled to the microcontroller. In an embodiment, a slit or hole may be formed through the housing of the active haptic stylus for the thin film flexible circuit lead line 380 to be passed through to the port associated with the microcontroller.

Figure 4:
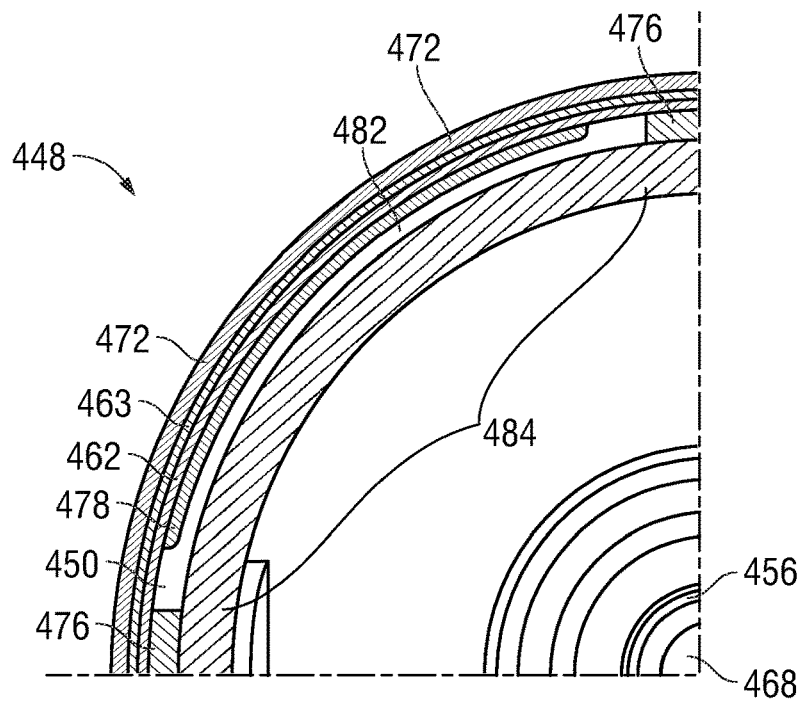
FIG. 4 is a partial cross-sectional, rear view of the spacer and haptic film assembly installed on a haptic stylus according to an embodiment of the present disclosure.

FIG. 4 is a partial cross-sectional, rear view of the spacer 460 and haptic film assembly 462 installed on a haptic stylus 448 according to an embodiment of the present disclosure. FIG. 4 shows a quarter section of the cross-section of the haptic stylus 448. However, the various layers and components of the haptic stylus 448 are shown with the stylus tip 456 at the bottom right of FIG. 4.

As shown in FIG. 4, the stylus tip 456 includes a moveable writing tip 468 that may be operatively coupled to a pressure sensor (not shown). The moveable writing tip 468 of the stylus tip 456 may be internally coupled to a pressure sensor (not shown) such that as pressure is exerted against the moveable writing tip 468, the moveable writing tip 468 may be moved or displaced a certain distance registering a pressure at the moveable writing tip 468 with the pressure sensor. As described herein, the pressure sensor may send this pressure data to the ink chip and microcontroller or other logic circuitry executing instruction of the embodiments herein (not shown) so that the microcontroller may generate haptic feedback signals that are sent to the haptic film assembly 462 in order to provide the haptic output at an amplitude and a frequency via the haptic film assembly 462 to mimic an inking sensation when the haptic stylus is used over a surface, such as a video display screen, at the detected pressure.

FIG. 4 further shows a housing 450 of the haptic stylus 448. The housing 450 may generally be in the form of a hollow column and may be operative coupled to the stylus tip 456 with its moveable writing tip 468 via, for example, an adhesive or other coupling device including a set of complimentary screw threads. The housing 450 may be cylindrical, oval, or of any extended polygonal shape in some embodiments. In an embodiment, the housing 450 may be made of a plastic. In another embodiment, the housing 450 may be made of a metal. In an embodiment, a slit or hole (not shown) may be formed through the housing 450 of the active haptic stylus 448 for the thin film flexible circuit lead line described herein to be passed through to a port associated with the microcontroller housed within the housing 450. At the cross-section in FIG. 4, the housing 450 is circumferentially notched along the length of the stylus 448 such that the outer diameter of the housing 450 is smaller to accommodate the haptic film assembly 462 and spacer 460.

The haptic stylus 448 includes a spacer 476 wrapped around or fit around the housing 450. In an embodiment, the spacer 476 is placed within a recess formed at a section of the housing 450 and sized to fit the dimensions of the spacer 476. In an embodiment, the spacer 460 is made of Mylar® or other rigid or semi-rigid material. As described in some embodiments herein, the spacer 476 includes one or more voids 484 and ribs 476. As shown the voids 484 may allow a space to be maintained between the EAP sections 478 and the housing 450 when the haptic film assembly 462 with its portions of the haptic EAP sections 478 are operatively coupled to the spacer 476. In an embodiment, the spacer 476 is operatively coupled to the housing 450 using an adhesive to secure the spacer 476 on the surface of the housing 450.

In an embodiment, the haptic film assembly 462 may be secured to the spacer 476 using an adhesive. In one embodiment, this adhesive may be applied to the ribs 476 of the spacer 460 only so that the adhesive does not interfere with the operation (e.g., vibration) of the EAP sections 478 of the haptic film assembly 462. As shown in FIG. 4, the EAP sections 478 are located along the surface of a flexible printed circuit for the haptic film assembly 462 so that the EAP sections 478 are placed within the voids 484 formed in the spacer 460. The haptic film assembly 462 may further include a number of metallic leads (not show) in the thin film flexible printed circuit board or layer from each EAP sections 478 through the thin film flexible circuit lead line (not shown), and coupled to the port associated with the microcontroller as described herein.

The haptic film assembly 462 and spacer 476 may also be covered by an outer layer 472. This outer layer may be coupled to a flexible printed circuit for the haptic film assembly 462 using an adhesive layer 462. In an embodiment, the dimensions of the outer layer 472 may extend past the dimensions lengthwise along the haptic stylus 448 of the haptic film assembly and spacer 476 so that the outer layer 472 may not only be secured to the flexible printed circuit of the haptic film assembly 462 and spacer 476, but also the housing 450 of the haptic stylus 448. In an embodiment, the outer layer 472 may be made of fabric or silicone as described herein and specifically in FIG. 2.

FIG. 5 is a perspective view of an arrangement of a spacer 560 and a haptic film assembly 562 for a haptic stylus relative to a printed circuit board (PCB) 552 according to an embodiment of the present disclosure. FIG. 5 is an exploded view with the spacer 560 removed from within the haptic film assembly 562 and the PCB 552.

As described herein, the spacer 560 includes a spaced lattice that allows the EAP sections 578 to be placed within the voids 575 formed in the spacer 560 when the haptic film assembly 562 is operative coupled to the spacer 560. The spacer 560 may be made of Mylar® or other suitable material that can act as a rigid or semi-rigid spacer that raises portions of the haptic film assembly 562 away from the housing of the haptic stylus described herein. In the embodiment shown in FIG. 5, the spacer 560 includes ribs 576 running between the voids 575 formed in the spacer 560. These ribs 576 may be located between the EAP sections 578 when the haptic film assembly 562 is operatively coupled to the spacer 560 so that the EAP sections 578 of the haptic film assembly 562 are maintained at a location away from the housing of the haptic stylus. This spacer 560 and its ribs 576 allows the EAP sections 578, therefore, to vibrate when activated without coming into contact with the housing of the haptic stylus.

Again, in some embodiments, the spacer 560 is made of Mylar® or other rigid or semi-rigid material. As described in some embodiments herein, the spacer 576 includes one or more voids 584 and ribs 576. As shown the voids 584 may allow a space to be maintained between the EAP sections 578 and the housing 550 when the haptic film assembly 562 with its portions of the haptic EAP sections 578 are operatively coupled to the spacer 576. In an embodiment, the spacer 576 is operatively coupled to the housing 550 using an adhesive to secure the spacer 576 on the surface of the housing 550. The haptic film assembly 562 includes a flexible printed circuit board (PCB) with one or more electro-active polymer (EAP) haptic film sections 578. The EAP haptic film sections 578 may be any polymer that exhibits a change in size or shape when stimulated by an electric field provided by via electrical leads formed in the PCB. The thin film flexible PCB may be arranged so that the haptic film sections of the haptic film assembly 562 are oriented inward to fit in the spacer gaps for room to allow movement of the EAP haptic film sections for haptic response and to further protect the haptic film EAP sections.

As described herein, the haptic film assembly 562 includes the thin film flexible circuit layers 577 with a thin film flexible circuit lead line 580. This thin film flexible circuit lead line 580 is used to provide an operative connection between the lead lines from each of the EAP sections 578 and an electrical port 586 associated with the microcontroller 554 and inking chip 553. This electrical port 586 may be a serial port that is operatively coupled to a PCB 552 within the housing of the haptic stylus and, via lead lines from the electrical port 586, is operatively coupled to the microcontroller 554. In an embodiment, a slit or hole may be formed through the housing of the active haptic stylus for the thin film flexible circuit lead line 580 to be passed through to the electrical port 586 associated with the microcontroller 554.

Although not shown, the PCB 552 may further include any number of other devices used during the operation of the haptic stylus described herein. These other devices may include any number of sensors including a motion sensor, a BT wireless radio, a PMU, or other power source connectivity such as electrical leads to a rechargeable battery, among others.

Figure 6A:
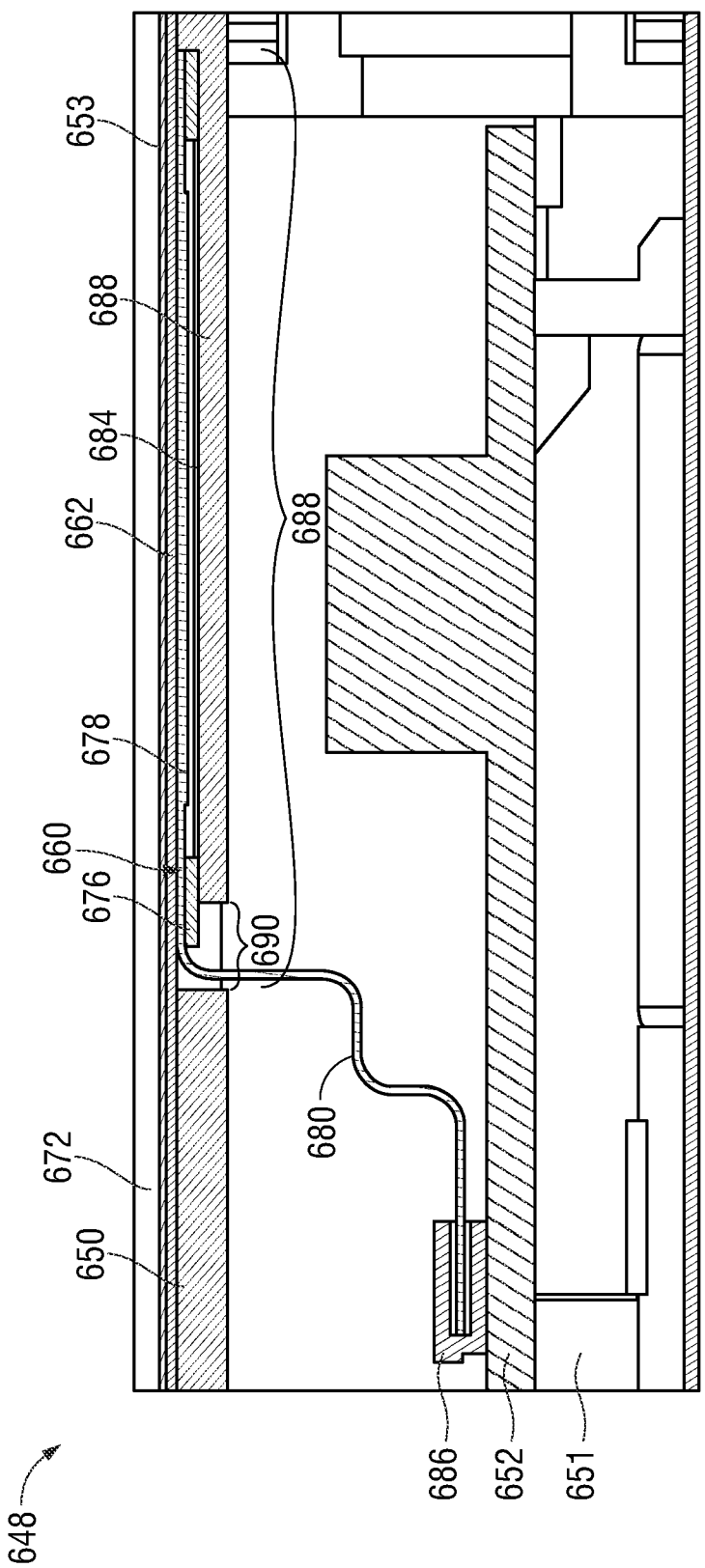
FIG. 6A is a cross-sectional, side view of an arrangement of a spacer and a haptic film assembly for a haptic stylus relative to a printed circuit board (PCB) according to an embodiment of the present disclosure.
Figure 6B:
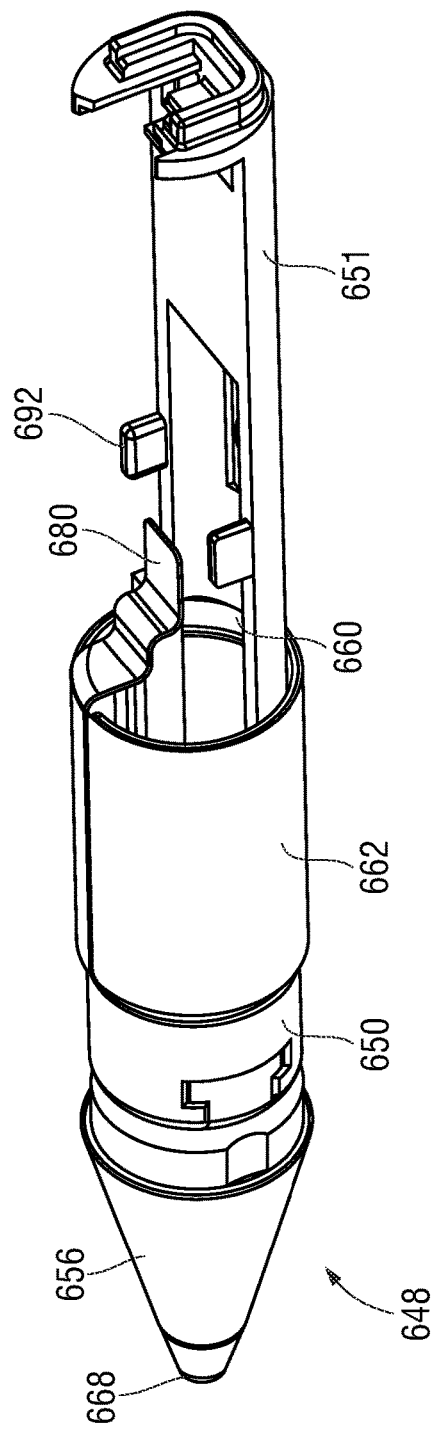
FIG. 6B is a perspective view of an arrangement of a spacer and a haptic film assembly for a haptic stylus relative to a stylus tip according to an embodiment of the present disclosure.
Figure 6C:
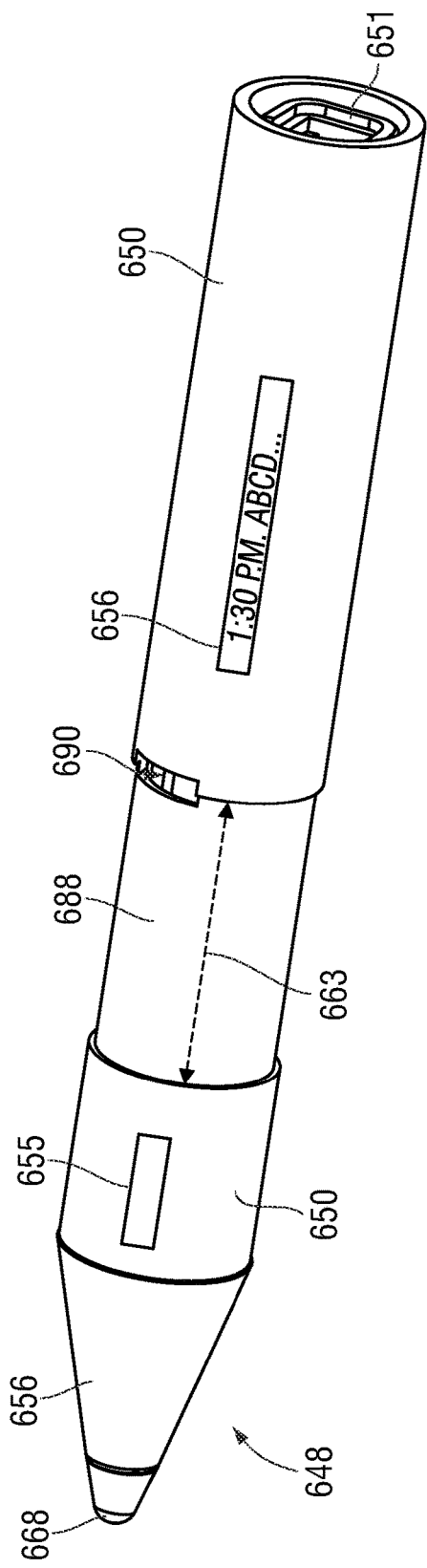
FIG. 6C is a perspective view of a housing for a haptic stylus relative to a stylus tip according to an embodiment of the present disclosure.

Turning now to FIGS. 6A, 6B, and 6C, FIG. 6A is a cross-sectional, side view of an arrangement of a spacer 660 and a haptic film assembly 662 for a haptic stylus 648 relative to a PCB 652 according to an embodiment of the present disclosure. FIG. 6B is a perspective view of an arrangement of a spacer 660 and a haptic film assembly 662 for the haptic stylus 648 relative to a stylus tip 656 according to an embodiment of the present disclosure. FIG. 6C is a perspective view of a housing 650 for a haptic stylus 648 relative to a stylus tip 656 according to an embodiment of the present disclosure. These figures show a housing 650 of the haptic stylus 648. The housing 650 may generally be in the form of a hollow column and may be operative coupled to the stylus tip including its moveable writing tip 668 via, for example, press fit in a stylus tip 656 assembly, via an adhesive, or via another coupling device including a set of complimentary screw threads.

In an embodiment, a pressure sensor may be placed at the stylus tip 656 (shown in FIGS. 6B and 6C) and operatively coupled to the moveable writing tip 668 and used to provide an inking chip and a microcontroller with pressure data in order to determine the pressure against a surface such as a video/graphics display device, a pad, or other surface during use of the haptic stylus 648. The detected pressure may be used via the inking chip or a combined microcontroller unit detect an inking function and to vary the thickness or other aspect of the line appearing on the digital display device being written on with wireless or wired communication to the information handling system. The detected pressure may also be used via the microcontroller unit to vary the amplitude and frequency of the vibrations created by the haptic film assembly with the EAP in order to provide a different haptic sensation to the user. In an embodiment, an inductive sensor may be placed within the stylus tip 656 for the digitizer of a video display device to detect the inductive interactions. This interaction allows the active haptic stylus 648 to provide input to the information handling system via a digitizer in the video/graphic display device (e.g., FIG. 1, 116). This input includes providing virtual writing input directly on a graphic display on the video/graphic display device, input object selection via a dedicated function button 655 on the active haptic stylus 648, as well as other inputs that are based on the selectable icons and programs executed on the information handling system and presented to the user via the video/graphic display device. The digitizer within the video/graphic display device, where available, may transmit this input to a dedicated controller or the processor of the information handling system to provide data on pen location, pressure, and other functionalities of the haptic stylus 648.

The haptic stylus 648, along with the function button 655 may also include an LCD screen 656. The LCD screen 656 and function button 655 may both be used to add functionality to the haptic stylus 648 as well as provide or change the type of input, such as writing or drawing modes, at the video-graphics display device. Both the function button 655 and LCD screen 656 may be operatively coupled to a microcontroller to receive input from the function button 655 and provide output via the LCD screen 656. In an embodiment, the function button 655 may also allow a user, through a series of actuations for example, to change the haptic feedback experienced during use of the haptic stylus 648. In this example embodiment, the LCD screen 656 may display a current haptic feedback characteristics produced by the haptic film assembly 662 with the EAP (e.g., frequency or amplitude expressed via indicators such as heavy, light, medium, etc.) that can be toggled between using the function button 655. The menu presented on the LCD screen 656 may include any number of sub-menus that allows the user to, for example, change the time and date, change writing or drawing modes, change the haptic feedback, access charging data, pairing data between the haptic stylus 648 and the information handling system, and the like. In an embodiment, the LCD screen 656 may continuously display a date and time and current haptic feedback settings as described herein.

A portion of the housing 678 may be notched forming a recess 688 having a smaller circumference or other outer dimension than the other portions of the housing 678 to accommodate a haptic film assembly 662 and spacer 660. In an embodiment, the housing 650 may be made of a plastic. In another embodiment, the housing 650 may be made of a metal. In an embodiment, an aperture such as a slit 690 may be formed through the housing 650 of the active haptic stylus 648 for the thin film flexible circuit lead line 680 described herein to be passed through to an electrical port 686 associated with a microcontroller (not shown) housed within the housing 550 and operatively coupled to the PCB 652 and electrical port 686. The housing 650 may house an inner mount 651 that is operatively coupled within the housing 650 and formed to hold the PCB 652 in place. With reference to FIG. 6B, the inner mount 651 may include PCB mounting pegs 692 used to secure the PCB 652 to the inner mount 651 so that movement of the haptic stylus 648 does not cause the PCB 652 to move within the housing 650.

As described herein, the haptic stylus 648 includes a spacer 660 wrapped around or fit around the housing 650. In an embodiment, the spacer 660 is placed within the recess 688 formed at a section of the housing 650 and sized to fit the dimensions of the spacer 660 having a length 663 to fit the spacer 660 therein. In an embodiment, the spacer 660 is made of Mylar® or other rigid or semi-rigid material. As described in some embodiments herein, the spacer 660 includes several voids 684 and ribs 676. As shown the voids 684 may allow a space to be maintained between the EAP sections 678 and the housing 650 when the haptic film assembly 662 with its EAP sections 678 are operatively coupled to the spacer 660. In an embodiment, the spacer 660 is operatively coupled to the housing 650 using an adhesive to secure the spacer 660 on the surface of the housing 650.

In an embodiment, the haptic film assembly 662 may be secured to the spacer 660 using an adhesive. In an embodiment, this adhesive may be applied to the ribs 676 of the spacer 660 only so that the adhesive does not interfere with the operation (e.g., vibration) of the piezoelectric devices 678 of the haptic film assembly 662. As shown in FIG. 6, the EAP sections 678 are located along the surface of the haptic film assembly 662 so that the EAP sections 678 placed within the voids 684 formed in the spacer 660. The haptic film assembly 662 may further include any number of metallic leads (not show) from each EAP sections 678 through the thin film flexible circuit lead line 680, and coupled to the electrical port 686 associated with the microcontroller as described herein.

The haptic film assembly 662 and spacer 660 may also be covered by an outer layer 672. This outer layer may be coupled to the haptic film assembly 662 using an adhesive layer 653. In an embodiment, the lengthwise dimensions of the outer layer 672 may extend past the dimensions of the haptic film assembly and spacer 660 so that the outer layer 672 may not only be secured to the haptic film assembly 662 and spacer 660, but also the housing 650 of the haptic stylus 648. In an embodiment, the outer trim layer 672 may be made of fabric or silicone as described herein and specifically in FIG. 2.

In an embodiment, the haptic film assembly 662 may be shorter in a lengthwise dimension along the haptic stylus 648 than the lengthwise dimensions 663 of the recess 688 in the housing 650. In this embodiment, this may permit freedom of movement of the haptic film assembly 662. Additionally, this shorter length of the haptic film assembly 662 than the recess length 663 may prevent the EAP sections 678 from impacting the rigid housing 650 in some embodiments.

Figure 7:
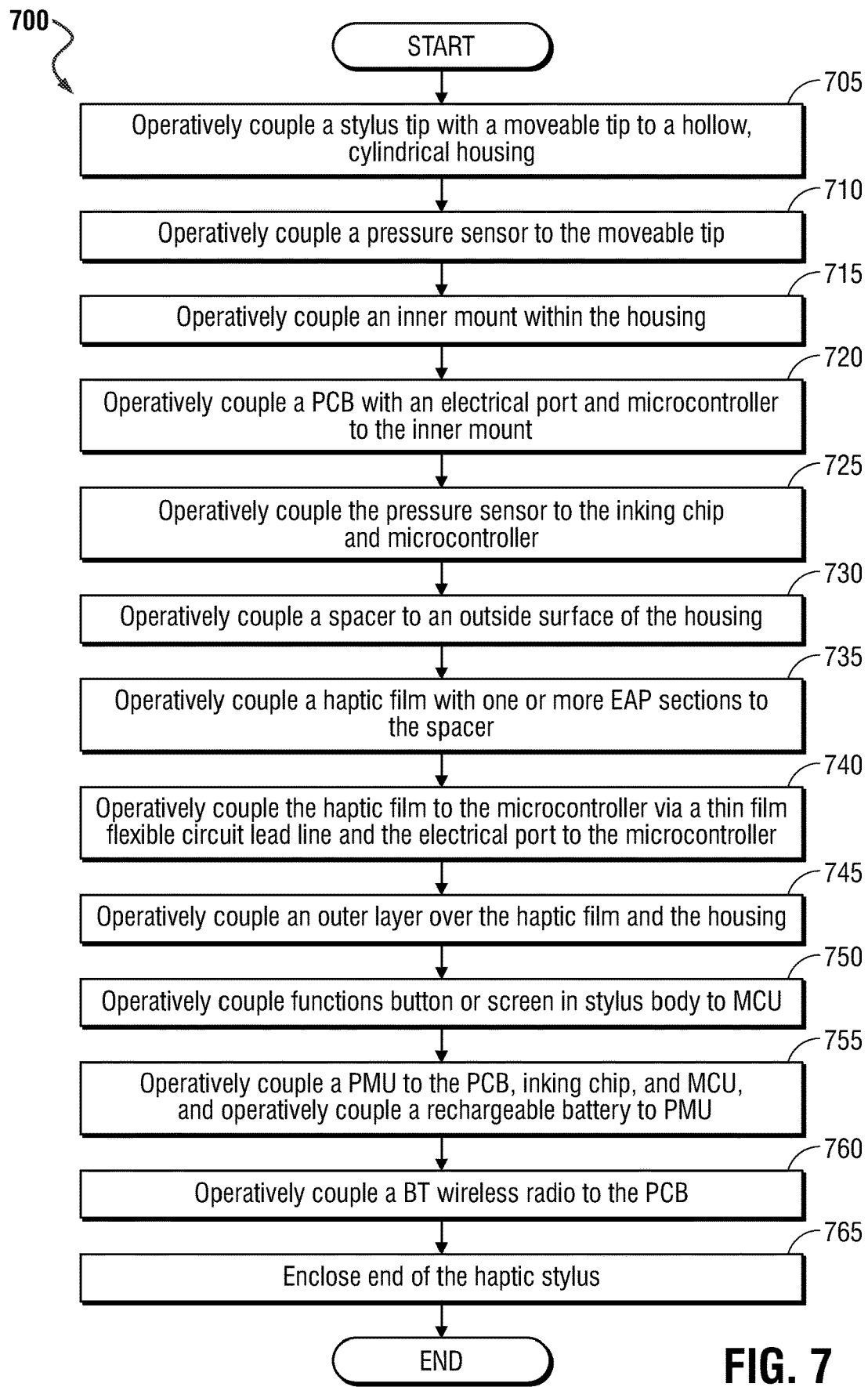
FIG. 7 is a flow diagram illustrating a method of manufacturing a haptic stylus according to an embodiment of the present disclosure.

FIG. 7 is a flow diagram illustrating a method 700 of manufacturing a haptic stylus according to an embodiment of the present disclosure. The method 700 may begin at block 705 with operatively coupling a stylus tip assembly with a moveable writing tip to a hollow cylindrical housing at block 705. The moveable writing tip of the stylus tip assembly may be internally coupled to a pressure sensor such that as pressure is exerted against the moveable writing tip, the moveable writing tip may be moved or displaced a certain distance registering a pressure at the moveable writing tip with the pressure sensor. In an embodiment, the stylus tip assembly may include an inductive coil or sensor for a digitizer in a display device of an information handling system to detect the inductive interactions between the digitizer and the inductive coil. This interaction allows the active haptic stylus to provide input to the information handling system via this digitizer in the video/graphic display device. This input includes providing virtual writing input directly on a graphic display on the video/graphic display device, input object selection via a dedicated function button on the active haptic stylus, as well as other inputs that are based on the selectable icons and programs executed on the information handling system and presented to the user via the video/graphic display device 116. The digitizer within the video/graphic display device, where available, may transmit this input to a dedicated controller or to the processor, embedded controller or other processor to provide data on pen location, pressure, and other functionalities of the haptic stylus 148. In an embodiment, the moveable writing tip, the stylus tip assembly, and housing may be made of plastic. In an embodiment, the moveable writing tip, the stylus tip assembly, and housing may be made of metal or a combination of metal and plastic. In an embodiment, the housing may generally be in the form of a hollow column and may be operatively coupled to the stylus tip assembly with its moveable writing tip via, for example, an adhesive or other coupling device including a set of complimentary screw threads or may be fit (e.g., press fit or snap fit) into an end of the stylus top assembly.

The method 700 may then continue with operatively coupling a pressure sensor to the moveable writing tip at block 710. As described, the moveable writing tip may be allowed to move a distance into the pressure sensor that coordinates with the pressure a user presses the haptic stylus against a surface such as a surface of a video/graphics display device.

The method 700 further includes operatively coupling an inner mount within the housing at block 715. This inner mount may fit within the housing along a side of the housing opposite a slit formed into the housing and used to pass a thin film flexible circuit lead line therethrough as described herein. In an embodiment, a snap fit, a press fit, or fastener or an adhesive may be used to secure the inner mount within the housing. In an embodiment, the inner mount may include PCB mounting pegs used to secure the PCB to the inner mount so that movement of the haptic stylus does not cause the PCB to move within the housing. The inner mount may include any coupling devices such as clips or fasteners used to hold a PCB thereon. The method, at block 720, includes operatively coupling the PCB to the inner mount. In an embodiment, the PCB may include an electrical port, a microcontroller, and an inking chip, along with other devices such as a PMU or a power source connection, and a BT wireless radio. It is understood that in some embodiments, a single controller or processing chip may be installed that executes code instructions to perform the operations of both the inking chip and the microcontroller unit rather than utilization of separate chips as described in various other embodiments herein.

In an embodiment, the method 700 may include operatively coupling the pressure sensor to the inking chip and the microcontroller or a combination processing chip at block 725. In an embodiment, the pressure sensor may include any number of electrical leads to the PCB having the inking chip and the microcontroller (or combination processing chip). For example, the inking chip and microcontroller unit may be a combined ASIC or may be separate control logic chip. As described herein, and with the user gripping the active haptic stylus, the user may provide input to the information handling system by causing the stylus tip assembly to come into contact with the video-graphics display device. As described herein, the interaction between the inductor coil formed within the stylus tip assembly and the digitizer in the display screen of the information handling system allows the active haptic stylus to provide input to the information handling system. This input includes providing virtual writing input directly on a graphic display on the video/graphic display device, input object selection via a dedicated function button on the active haptic stylus, as well as other inputs that are based on the selectable icons and programs executed on the information handling system 100 and presented to the user via the video/graphic display device. In example embodiments, the pressure of the stylus tip assembly against the surface of the video-graphics display device may cause the thickness of the lines created to be rendered thicker when the pressure is higher or thinner when the pressure is lower on the display device via the inking chip. This differing amount of pressure may be detected by the pressure sensor within the stylus tip assembly. Further, the sensed pressure data may be sent to the microcontroller for the microcontroller to create haptic feedback that to mimics an inking sensation over a surface at the detected pressure such as for a pen on paper in an example embodiment.

The method 700, at block 730, includes operatively coupling a spacer to an outside surface of the housing. In an embodiment, the spacer may be used to allow space for the EAP sections within the haptic film assembly to vibrate at the amplitude and frequency used to mimic the inking sensation over the surface of the active haptic stylus. In some example embodiments, the spacer may have a series of voids and a shape that matches the voids of the spacer with the placement of the EAP sections of the haptic film assembly. In this embodiment, the spacer includes a hole for each of the EAP sections of the haptic film assembly to be placed within when the haptic film assembly and spacer are operatively coupled to the outer circumferential surface of the housing. In an embodiment, the housing may have a recess into which the spacer is operatively coupled to the surface of the housing and then the haptic film assembly is operatively coupled to the spacer. This recess is deep enough to accommodate for the thicknesses of the spacer and haptic film assembly and cause the height of the haptic film assembly/spacer to be flush with the remaining portions of the housing.

In an embodiment, the housing may have a recess, such as a circumferential recess in a housing of the stylus, into which the spacer is operatively coupled to the surface of the housing and then the haptic film assembly is operatively coupled to the spacer. This recess is deep enough to accommodate for the thicknesses of the spacer and haptic film assembly and in some embodiments an outer layer and cause the height of the haptic film assembly/spacer to be flush with the remaining portions of the housing along the haptic stylus. In an embodiment, the haptic film assembly may be shorter in a lengthwise dimension along the haptic stylus than the lengthwise dimensions of the recess in the housing. In this embodiment, this may permit freedom of movement of the haptic film assembly. Additionally, this shorter length of the haptic film assembly may prevent the EAP sections from impacting the rigid housing in some embodiments.

The method 700 further includes operatively coupling a haptic film assembly with one or more EAP sections to the spacer at block 735. In an embodiment, the haptic film assembly may include one or more piezoelectric polymer film haptic actuators that are operatively coupled to a circumferential inner surface of the flexible circuit layer for the haptic film assembly that is attached external to the recessed housing of the active haptic stylus. The haptic film assembly may include one or more thin (e.g., 150 μm thick), flexible, electro-active polymer film sections that may be actuated at an amplitude and frequency according to the pressure detected by the pressure sensor at the stylus tip assembly or based on use of a function button or LCD screen on the haptic stylus for inking. A different frequency range (e.g., >1 kHz) may be used as feedback for a function button or an LCD screen interaction such as for a made selection of the like. In an embodiment, this frequency may be between 10 and 500 Hz. The number and location of the EAP sections may range from a one or two to more than two and may vary depending on the level of haptic feedback to be felt by the user. In an example embodiment, the number of EAP sections is four arranged equal distances from each other around the circumference of the housing.

The method 700 further includes operatively coupling the haptic film assembly to the microcontroller via a thin film flexible circuit lead line and the electrical port to the microcontroller at block 740. In an embodiment described herein, the thin film flexible circuit lead line operatively couples the haptic film assembly to the microcontroller in order to transmit the haptic feedback signals from the microcontroller to the individual EAP sections of the haptic film assembly. In an embodiment, a slit or hole may be formed through the housing of the active haptic stylus for the thin film flexible circuit lead line to be passed through to a port associated with the microcontroller.

The method 700 further includes, at block 745, operatively coupling an outer layer over the haptic film assembly and the housing. In an embodiment, the housing and/or haptic film assembly and spacer may be protected from being physically touched by the user during use. In an embodiment, the space around the haptic film assembly and spacer may be covered with a silicone or other outer layer (e.g., fabric) that prevents the user from touching the haptic film assembly and secure the haptic film assembly in place against the housing as well as provide additional grip friction for the user to grip the active haptic stylus. In another embodiment, a layer of fabric may be placed over the housing of the active haptic stylus including the haptic film assembly and spacer so that, again, the user may not physically touch the haptic film assembly and so that the active haptic stylus may have an aesthetic appeal. In either of these embodiments, a glue or other adhesive may be used to secure the silicone or fabric to the housing of the active haptic stylus as well as to the haptic film assembly and spacer so that the haptic film assembly and spacer do not move lengthwise along the surface of the housing during operation of the active haptic stylus. Still further, a glue or other adhesive may be used to secure the spacer to the housing and the haptic film assembly to the spacer. This allows the haptic film assembly to provide haptic output to a user while the haptic film assembly and spacer are maintained in one location.

In an embodiment, the method 700 includes forming or mounting a function button and an LCD screen on the housing, via one or more apertures in the housing for such features, that allows the user to provide further input with the haptic stylus and monitor the status of the functions of the haptic stylus at block 750. The LCD screen and function button may be operatively coupled to the inking chip, the microcontroller unit, or combination processing chip, and/or the Bluetooth radio described herein. In these example embodiments, the function button may be actuatable by a user in order to make mode changes and/or perform a selection process on a video/graphics display device. In the embodiment where the function button is used to change a mode of the haptic stylus, these modes may include, among other options, change a haptic feedback frequency or amplitude created by the operation of the haptic film assembly with the EAP sections. The function screen may provide haptic feedback modes currently selected by the user on the haptic stylus. The LCD screen and function button may both be used to add functionality to the haptic stylus as well as provide or change the type of input at the video-graphics display device. In an embodiment, the function button may also allow a user, through a series of actuations for example, to change the haptic feedback experienced during use of the haptic stylus. In this example embodiment, the LCD screen may display a current haptic feedback characteristics produced by the haptic film assembly with the EAP (e.g., frequency or amplitude expressed via indicators such as heavy, light, medium, etc.) that can be toggled between using the function button. The menu presented on the LCD screen may include any number of sub-menus that allows the user to, for example, change the time and date, change the writing or drawing mode, change the haptic feedback, access charging data, pairing data between the haptic stylus and the information handling system, and the like. In an embodiment, the LCD screen may continuously display a date and time and current haptic feedback settings as described herein.

The method 700 further includes operatively coupling the PMU or other power source to the PCB and operatively couple a rechargeable battery to the PMU at block 755. The PMU may be used to manage the electric voltages to be passed from the battery to the microcontroller, pressure sensor, and BT wireless radio as described herein. The PMU may also monitor the charge state of the rechargeable battery and cause a notice to be passed from the haptic stylus to an information handling system notifying the user of the depleted charge state.

The method 700 also includes operatively coupling the BT wireless radio to the PCB at block 760. Again, this BT wireless radio may be used to communicate with an information handling system. These communications may include the battery charge state as described herein and an orientation of the haptic stylus relative to a video/graphics display device, among other data.

The method 700 also includes closing an end of the haptic stylus at block 765. This may be done by placing a housing cap to the end and securing the housing cap to the hollow and cylindrical housing using, for example, via screw threads, a fastener, press fit, snap fit or an adhesive. At this point, the method 700 may end.

The blocks of the flow diagrams of FIG. 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system with a haptic stylus, comprising:
   a processor;
   a display device includes a digitizer sensor for use with the haptic stylus;
   a data storage device;
   a power management unit;
   the haptic stylus, including:
      a stylus housing;
      a microcontroller housed within the stylus housing;
      a stylus writing tip operatively coupled to a pressure sensor and to detect a pressure applied by the stylus writing tip on the display device of the information handling system;
      a spacer mounted around and operatively coupled to a circumferential surface of the stylus housing;
      a haptic film assembly operatively coupled to the spacer at the circumferential surface of the stylus housing and operable to provide haptic output via an electro-active polymer (EAP) section on the haptic film assembly to a user; and
   the microcontroller executing computer readable instructions to:
      receive, as input, a detected pressure applied at the stylus writing tip from the pressure sensor; and
      provide the haptic output, via the haptic film assembly and EAP section, at an amplitude and a frequency to mimic an inking sensation by the haptic stylus during use of the haptic stylus on a surface of the display device at the detected pressure for writing or drawing.

2. The information handling system of claim 1, wherein the haptic output provided at the amplitude and the frequency mimics the inking sensation over a piece of paper by the haptic stylus during use of the haptic stylus on the display device at the detected pressure.

3. The information handling system of claim 1 further comprising:
an outer protective layer formed around and operatively coupled to the haptic film assembly and a body of the stylus housing to prevent movement of the haptic film assembly lengthwise along the stylus housing during operation.

4. The information handling system of claim 1 further comprising: an inductive sensor within the stylus writing tip to interact with an electromagnetic field (EM) created on the display device of the information handling system for input to be indicated at a location on the display device.

5. The information handling system of claim 1 further comprising:
a plurality of EAP sections mounted on a flexible circuit board of the haptic film assembly; and
the haptic film assembly mounted around the circumferential surface of the stylus housing.

6. The information handling system of claim 1, wherein the frequency is between 10 and 500 Hz for the inking sensation.

7. The information handling system of claim 1 further comprising:
a recess formed into the circumferential surface of the stylus housing into which the spacer and haptic film assembly are placed.

8. A haptic stylus, comprising:
a stylus housing;
a microcontroller formed within the stylus housing;
a stylus writing tip including a pressure sensor and to detect a pressure applied by the stylus writing tip interfacing on a display device of an information handling system;
a spacer formed around and operatively coupled to a circumferential surface of the stylus housing;
a haptic film assembly including a plurality of electro-active polymer (EAP) sections mounted on a flexible printed circuit layer operatively coupled to the spacer at the circumferential surface of the stylus housing and operable to provide haptic output via the EAP sections to a user; and
the microcontroller executing computer readable instructions to:
receive, as input, a detected pressure applied at the stylus writing tip from the pressure sensor; and
provide the haptic output, via the EAP sections of the haptic film assembly, at an amplitude and a frequency to mimic an inking sensation of the haptic stylus during use of the haptic stylus on a surface of the display device at the detected pressure.

9. The haptic stylus of claim 8, wherein the haptic output provided by the EAP sections of the haptic film assembly at the amplitude and the frequency that mimics the inking sensation over a piece of paper by the haptic stylus being used on the surface of the display device at the detected pressure.

10. The haptic stylus of claim 8 further comprising:
the EAP sections oriented inward towards the stylus housing to protect the EAP sections with the outer thin film flexible printed circuit of the haptic film assembly.

11. The haptic stylus of claim 8 further comprising:
the spacer including one or more voids into which the EAP sections are placed to allow for vibration of the EAP sections during operation of the haptic stylus.

12. The haptic stylus of claim 8 further comprising: a function button on the stylus housing to receive actuation input from the user to select different functional modes of the haptic stylus and selection of the modes to be indicated via haptic feedback at the EAP sections of the haptic film assembly at a different frequency than for the inking sensation during writing.

13. The haptic stylus of claim 8, wherein the frequency is between 10 and 500 Hz for the inking sensation during writing.

14. The haptic stylus of claim 8 further comprising:
a recess formed into the circumferential surface of the stylus housing into which the spacer and haptic film assembly are placed.

15. A haptic feedback stylus to interface with an information handling system, comprising:
a stylus housing;
a printed circuit board (PCB) housed within the stylus housing;
a microcontroller operatively coupled to the PCB and operatively coupled to a power source housed within the stylus housing;
a spacer formed around and operatively coupled to a circumferential surface of the stylus housing;
a haptic film assembly operatively coupled to the microcontroller via a flexible circuit lead line passed through a via formed in the stylus housing, the haptic film assembly coupled to the spacer around the circumferential surface of the stylus housing to provide haptic output via an electro-active polymer (EAP) section mounted on the haptic film assembly;
a stylus writing tip including a pressure sensor to detect a pressure applied by the stylus writing tip on a display device of the information handling system;
the microcontroller executing computer readable instructions to:
receive, as input, a detected pressure applied at the stylus writing tip from the pressure sensor; and
provide the haptic output, via the EAP section of the haptic film assembly, at an amplitude and a frequency to mimic an inking sensation by the haptic feedback stylus over a surface of the display device at the detected pressure.

16. The haptic feedback input device of claim 15 further comprising:
an inking chip operatively coupled to the PCB to detect an inking operation based on detected pressure determinative of the thickness of a line reproduced on the display device.

17. The haptic feedback input device of claim 15 further comprising:
a plurality of EAP sections mounted on a flexible circuit board of the haptic film assembly; and
a plurality of spacer voids into which each EAP section is placed to permit vibration of the EAP sections of the haptic film assembly.

18. The haptic feedback input device of claim 15, wherein the frequency is between 10 and 500 Hz.

19. The haptic feedback input device of claim 15 further comprising:

a recess formed into the circumferential surface of the stylus housing into which the spacer and haptic film assembly are placed.

20. The haptic feedback input device of claim 15, wherein the haptic output provided at the amplitude and the frequency mimics the inking sensation over a piece of paper by the haptic feedback stylus at the detected pressure.

* * * * *